PROCESS FOR MAKING CORTISONE

Gunther S. Fonken, Kalamazoo, Mich., assignor to The Upjohn Company, Kalamazoo, Mich., a corporation of Michigan No Drawing. Application September 26, 1952
Serial No. 311,800

8 Claims. (Cl. 260—397.45)

This invention relates to steroids and more particularly to a process for the preparation of 17α,21-dihydroxy-4-pregnene-3,11,20-trione (cortisone) by the selective oxidation of 11α,17α,21-trihydroxy-4-pregnene-3,20-dione (compound epi F).

It is an object of this invention to provide a process for the selective oxidation of 11α,17α,21-trihydroxy-4-pregnene-3,20-dione. Another object is to convert 11α,17α,21-trihydroxy-4-pregnene-3,20-dione to 17α,21-dihydroxy-4-pregnene-3,11,20-trione. Other objects will be apparent to one skilled in the art to which this invention pertains.

The novel process of this invention can be represented by the following structural formulae:

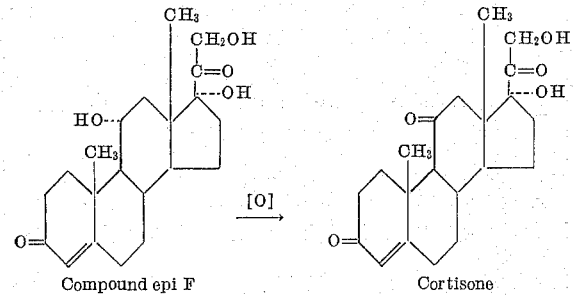

Compound epi F        Cortisone

Preparation of the starting compound, 11α,17α,21-trihydroxy-4-pregnene-3,20-dione, is disclosed in United States Patent 2,602,769, issued July 8, 1952.

Prior to the present invention, it was believed that oxidation of 11α,17α,21-trihydroxy-4-pregnene-3,20-dione would either degrade the side chain at the 17-position, as shown by Reichstein, Helv. Chim. Acta, 19, 29 (1936), or preferentially oxidize the 21-hydroxy group. It has now been unexpectedly found that the present novel process of selectively oxidizing 11α,17α,21-trihydroxy-4-pregnene-3,20-dione to produce cortisone can be successfully accomplished suitably under either aqueous or anhydrous conditions in a heterogeneous reaction system or, more preferably, in a homogeneous reaction system with chromic acid. The selective oxidation is performed with an oxidizing agent used in a proportion of up to four, or about from one to four, chemical equivalents of oxidizing agent per mol of starting steroid such as, for example, about two mols of chromic acid per three mols of starting steroid. Excessive oxidizing agent is to be avoided since it will result in undesirable oxidation at other positions in the molecule.

When oxidation is carried out heterogeneously, 11α,17α,21-trihydroxy-4-pregnene-3,20-dione is suitably dissolved in an organic solvent which is substantially non-reactive with the reactants and reaction products, and is substantially immiscible with water. Solvents such as benzene, chloroform, normal hexane, carbon tetrachloride, and chlorobenzene may be advantageously employed, the latter solvent being preferred. The oxidizing medium is prepared by dissolving an alkali metal dichromate salt in water, the hydrated sodium dichromate $(Na_2Cr_2O_7 \cdot 2H_2O)$ being the preferred dichromate salt, although other dichromate or even chromate salts can be used. To the resulting aqueous alkali metal dichromate solution is added an acid, for example, a mineral acid such as sulfuric acid, or a sulfonic acid, such as para-toluene-sulfonic acid. Such an oxidizing medium results in the formation of chromic acid in the solution which acts as the oxidizing agent. The function of the acid is merely to furnish hydrogen ions in the oxidizing medium and therefore, acids such as sulfuric, phosphoric, and the like, may be employed. The solution of the starting steroid in the organic solvent is then admixed with the aqueous oxidizing medium, formed by reaction of the alkali metal dichromate solution with the acid, at a temperature below about thirty degrees centigrade, the temperature range of from about minus thirty degrees centigrade to about thirty degrees centigrade being entirely satisfactory with about minus ten to plus ten degrees centigrade being the preferred temperature range. The order of mixing the reactants is not critical and admixing of the solutions is generally conducted by adding small portions of one solution to the other at the indicated temperatures, accompanied by continual stirring or other agitation. The entire mixture is usually stirred for an additional period of from about one-half to about five hours, during which time the oxidation of the 11-hydroxy group to the keto group is effected. Upon completion of the oxidation, usually in from about one-half to eight hours, with about two hours being preferred, the organic layer is separated from the aqueous layer by conventional separation procedures. The aqueous layer may then be extracted with successive portions of benzene or other organic solvent which is substantially water-immiscible and in which the product is soluble. The organic extractions are separated and combined with the first organic layer and the combined organic solutions are then washed with successive portions of water and sodium bicarbonate or other weakly basic solution to remove any acidic material. The oxidized product may then be recovered from the organic layer by conventional procedure, such as drying over anhydrous sodium sulfate, filtering and concentrating to give the desired cortisone.

When oxidation is carried out homogeneously, 11α,17α,21-trihydroxy-4-pregnene-3,20-dione is suitably dissolved in an organic solvent which is substantially non-reactive with the reactants and is substantially miscible with water. Acid solvents of the lower aliphatic acid series, such as propionic acid and acetic acid, may be advantageously employed, the latter acid being preferred. The chromic acid oxidizing medium, used as such or formed in situ, may be prepared by dissolving chromium trioxide in acetic acid or acetic acid and water. The solution of the starting steroid is then admixed with the oxidizing medium at a temperature range of from about zero degrees to about thirty degrees centigrade. Upon completion of the oxidation, usually in from a few seconds to several hours, with about one minute to fifteen minutes being preferred, the resulting cortisone is extracted by conventional procedures.

The following examples are illustrative of the processes and products of this invention and are not to be construed as limiting.

EXAMPLE 1

Adrenosterone $\left(\dfrac{15\text{ equivalents chromic acid}}{1\text{ mol steroid}}\right)$ A solution of fifty milligrams of 11α,17α,21-trihydroxy-4-pregnene-3,20-dione in five milliliters of glacial acetic acid was mixed with seventy milligrams of chromic anhydride dissolved in 12.5 milliliters of glacial acetic acid and one drop of water. After remaining at room temperature for 48 hours, the reaction mixture was diluted with forty milliliters of water. The mixture was extracted with four 25-milliliter portions of ether. The combined extracts were washed four times with eleven-milliliter portions of a mixture of ten milliliters of seven percent sodium bicarbonate and one milliliter of ten percent sodium hydroxide followed by three fifteen-milliliter portions of water. The ether extract was then dried with 0.2 gram of anhydrous sodium sulfate and, after evaporation, 27 milligrams of a crystalline product resulted. Recrystallization from 25 milliliters of ether and 25 milliliters of Skellysolve B petroleum ether was accomplished in an ice bath in one hour to give twelve milligrams of adrenosterone (4-androstene-3,11,17-trione).

EXAMPLE 2

Cortisone $$\left(\frac{2 \text{ equivalents chromic acid}}{1 \text{ mol steroid}}\right)$$

An ice bath-chilled solution of 101.1 milligrams of 11α,17α,21-trihydroxy-4-pregnene-3,20-dione dissolved in four milliliters of glacial acetic acid was mixed with a chilled solution of twenty milligrams of chromic anhydride ($CrO_3$) dissolved in eight milliliters of glacial acetic acid and stirred for two minutes while cooled in the ice bath. The reaction mixture was then poured into fifty milliliters of water, extracted with four twenty-milliliter portions of methylene chloride, and the combined organic extracts were washed with two fifty-milliliter portions of sodium bicarbonate solution. After drying the methylene chloride solution by filtration through anhydrous sodium sulfate, it was concentrated to dryness under reduced pressure to give 72 milligrams of crystals consisting of 45.5 percent cortisone.

EXAMPLE 3

Cortisone $$\left(\frac{1 \text{ equivalent chromic acid}}{1 \text{ mol steroid}}\right)$$

To a solution of 99.9 milligrams of 11α,17α,21-trihydroxy-4-pregnene-3,20-dione in three milliliters of glacial acetic acid was added, all at once, a solution of ten milligrams (55 percent of theory for one active oxygen) of chromic anhydride ($CrO_3$) in about five milliliters of glacial acetic acid. The mixture was placed in an ice bath immediately and was stirred vigorously for ninety seconds. It was then poured into fifty milliliters of water, extracted with four twenty-milliliter portions of methylene chloride, and the combined organic extracts were washed with two fifty-milliliter portions of sodium bicarbonate solution. After drying the methylene chloride solution by filtration through anhydrous sodium sulfate it was concentrated to dryness under reduced pressure to give a 24 percent yield of cortisone.

EXAMPLE 4

Cortisone $$\left(\frac{1 \text{ equivalent chromic acid}}{1 \text{ mol steroid}}\right)$$

A solution of eleven milligrams (55 percent of theory for one active oxygen) of chromic anhydride in 2.5 milliliters of an eighty percent acetic acid-twenty percent water mixture was added slowly with vigorous stirring to a solution of 102.4 milligrams of 11α,17α,21-trihydroxy-4-pregnene-3,20-dione in three milliliters of glacial acetic acid. The oxidant was consumed instantaneously, and the addition required less than five minutes. The reaction mixture was stirred for one minute longer, and was then worked up as described above to give a 28.5 percent yield of cortisone.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process which comprises reacting 11α,17α,21-trihydroxy-4-pregnene-3,20-dione with up to and including four chemical equivalents of chromic acid per mol of 11α,17α,21-trihydroxy-4-pregnene-3,20-dione to produce 17α,21-dihydroxy-4-pregnene-3,11,20-trione, said reaction being carried out at a temperature below about thirty degrees centigrade and being terminated before excessive oxidation to adrenosterone takes place.

2. A process which comprises mixing 11α,17α,21-trihydroxy-4-pregnene-3,20-dione with about from one to four chemical equivalents of chromic acid per mol of 11α,17α,21-trihydroxy-4-pregnene-3,20-dione to produce 17α,21-dihydroxy-4-pregnene-3,11,20-trione, and separating the resulting 17α,21-dihydroxy-4-pregnene-3,11,20-trione, said reaction being carried out at a temperature below about thirty degrees centigrade and being terminated before excessive oxidation to adrenosterone takes place.

3. A process which comprises mixing 11α,17α,21-trihydroxy-4-pregnene-3,20-dione with about two mols of chromic acid per three mols of 11α,17α,21-trihydroxy-4-pregnene-3,20-dione to produce 17α,21-dihydroxy-4-pregnene-3,11,20-trione, said reaction being carried out at a temperature below about thirty degrees centigrade and being terminated before excessive oxidation to adrenosterone takes place.

4. A process which comprises mixing 11α,17α,21-trihydroxy-4-pregnene-3,20-dione with about from one to four chemical equivalents of chromic acid per mol of 11α,17α,21-trihydroxy-4-pregnene-3,20-dione at a temperature of from about minus ten degrees centigrade to plus ten degrees centigrade to produce 17α,21-dihydroxy-4-pregnene-3,11,20-trione, and separating the resulting 17α,21-dihydroxy-4-pregnene-3,11,20-trione.

5. A process which comprises mixing 11α,17α,21-trihydroxy-4-pregnene-3,20-dione with about one to four chemical equivalents of chromic acid per mol of 11α,17α,21-trihydroxy-4-pregnene-3,20-dione at below room temperature to produce 17α,21-dihydroxy-4-pregnene-3,11,20-trione, and separating the resulting 17α,21-dihydroxy-4-pregnene-3,11,20-trione.

6. A process which comprises mixing 11α,17α,21-trihydroxy-4-pregnene-3,20-dione with about the stoichiometric amount of chromic acid at below room temperature to produce 17α,21-dihydroxy-4-pregnene-3,11,20-trione, and separating the resulting 17α,21-dihydroxy-4-pregnene-3,11,20-trione.

7. A process which comprises mixing 11α,17α,21-trihydroxy-4-pregnene-3,20-dione with chromic acid in the proportions of about one to four chemical equivalents of chromic acid for each mole of steroid in a substantially water-miscible inert organic solvent to provide a homogeneous reaction medium at a temperature not greater than thirty degrees centigrade and terminating the reaction within a period of not more than about fifteen minutes whereby to minimize oxidation to adrenosterone.

8. Process for producing 17α,21-dihydroxy-4-pregnene-3,11,20-trione which comprises reacting in glacial acetic acid 11α,17α,21-trihydroxy-4-pregnene-3,20-dione and chromic acid in the proportions of not more than about two moles of chromic acid for each three moles of steroid, at a temperature below room temperature, terminating the reaction within a period of not more than about fifteen minutes by pouring the reaction mixture into a relatively large volume of water, and extracting the resulting aqueous solution with a chlorinated methane solvent.

References Cited in the file of this patent

UNITED STATES PATENTS 2,602,769 Murray _____ July 8, 1952